US008613305B2

(12) United States Patent
Yu

(10) Patent No.: US 8,613,305 B2
(45) Date of Patent: Dec. 24, 2013

(54) AUTOMOBILE WITH ELECTRIC MOTOR COMPRISING A COOLING CIRCUIT FOR THE ELECTRONIC POWER CIRCUIT CONNECTED TO A HEATING RADIATOR OF THE PASSENGER COMPARTMENT

(75) Inventor: Robert Yu, Montigny le Bretonneux (FR)

(73) Assignee: Renault s.a.s., Boulogne-Billancourt (FR)

( * ) Notice: Subject to any disclaimer, the term of this patent is extended or adjusted under 35 U.S.C. 154(b) by 30 days.

(21) Appl. No.: 13/124,072

(22) PCT Filed: Sep. 30, 2009

(86) PCT No.: PCT/FR2009/051862
§ 371 (c)(1),
(2), (4) Date: Jun. 30, 2011

(87) PCT Pub. No.: WO2010/043795
PCT Pub. Date: Apr. 22, 2010

(65) Prior Publication Data
US 2011/0247783 A1 Oct. 13, 2011

(30) Foreign Application Priority Data
Oct. 14, 2008 (FR) ...................................... 08 05687

(51) Int. Cl.
*B60H 1/00* (2006.01)

(52) U.S. Cl.
USPC .......................................... 165/47; 123/41.14

(58) Field of Classification Search
USPC .......... 180/65.31, 68.1, 306, 309; 165/41, 42, 165/43, 47, 202
See application file for complete search history.

(56) References Cited

U.S. PATENT DOCUMENTS

| 4,354,565 A | * | 10/1982 | Latter et al. ................... 180/69.5 |
| 4,549,505 A | * | 10/1985 | Hirano ......................... 123/41.08 |
| 4,601,264 A | * | 7/1986 | Hirano ......................... 123/41.27 |
| 4,678,118 A | | 7/1987 | Fukami et al. |
| 5,080,167 A | * | 1/1992 | Wolf .............................. 165/140 |
| 5,165,377 A | * | 11/1992 | Hosseini ..................... 123/41.12 |
| 5,483,807 A | * | 1/1996 | Abersfelder et al. ........... 62/435 |
| 5,528,900 A | * | 6/1996 | Prasad ............................ 62/175 |

(Continued)

FOREIGN PATENT DOCUMENTS

| EP | 1 176 040 | 1/2002 |
| EP | 1 273 466 | 1/2003 |
| FR | 2 757 456 | 6/1998 |

OTHER PUBLICATIONS

International Search Report Issued Dec. 14, 2009 in PCT/FR09/051862 filed Sep. 30, 2009.

*Primary Examiner* — Katy M Ebner
*Assistant Examiner* — Brodie Follman
(74) *Attorney, Agent, or Firm* — Oblon, Spivak, McClelland, Maier & Neustadt, L.L.P.

(57) ABSTRACT

An automobile including an electric motor, a passenger compartment, an electronic power circuit, and a cooling circuit for the electronic power circuit, in which a coolant flows and which includes: a heat exchanger configured to discharge calories carried by the coolant to outside of the vehicle; a heating radiator provided upstream from the exchanger and configured to transfer the calories carried by the coolant to air in the passenger compartment; and an adiabatic tank configured to store at least a fraction of the coolant flowing in the cooling circuit.

7 Claims, 1 Drawing Sheet

(56) References Cited

U.S. PATENT DOCUMENTS

| | | | |
|---|---|---|---|
| 5,660,149 A * | 8/1997 | Lakerdas et al. | 123/41.44 |
| 5,722,250 A * | 3/1998 | Pomme | 62/244 |
| 5,749,329 A * | 5/1998 | Thurfjell | 123/41.14 |
| 5,845,612 A * | 12/1998 | Lakerdas et al. | 123/41.44 |
| 5,884,588 A * | 3/1999 | Ap et al. | 123/41.14 |
| 5,957,663 A * | 9/1999 | Van Houten et al. | 417/13 |
| 6,230,505 B1 * | 5/2001 | Noda et al. | 62/159 |
| 6,422,308 B1 * | 7/2002 | Okawara et al. | 165/202 |
| 6,604,576 B2 * | 8/2003 | Noda et al. | 165/202 |
| 6,616,059 B2 * | 9/2003 | Sabhapathy et al. | 237/12.3 B |
| 6,769,623 B2 * | 8/2004 | Ban et al. | 237/12.3 B |
| 6,904,766 B2 * | 6/2005 | Ito et al. | 62/324.1 |
| 7,140,330 B2 * | 11/2006 | Rogers et al. | 123/41.14 |
| 7,841,431 B2 * | 11/2010 | Zhou | 180/65.1 |
| 2002/0011221 A1 * | 1/2002 | Suzuki et al. | 123/41.14 |
| 2003/0006239 A1 | 1/2003 | Onimaru et al. | |
| 2003/0200948 A1 * | 10/2003 | Ban et al. | 123/142.5 R |
| 2006/0011150 A1 * | 1/2006 | Rogers et al. | 123/41.14 |
| 2006/0169790 A1 * | 8/2006 | Caesar et al. | 237/12 |
| 2008/0282729 A1 * | 11/2008 | Mola et al. | 62/498 |
| 2010/0025006 A1 * | 2/2010 | Zhou | 165/41 |
| 2011/0247783 A1 * | 10/2011 | Yu | 165/47 |
| 2011/0251019 A1 * | 10/2011 | Ulrey et al. | 477/98 |

* cited by examiner

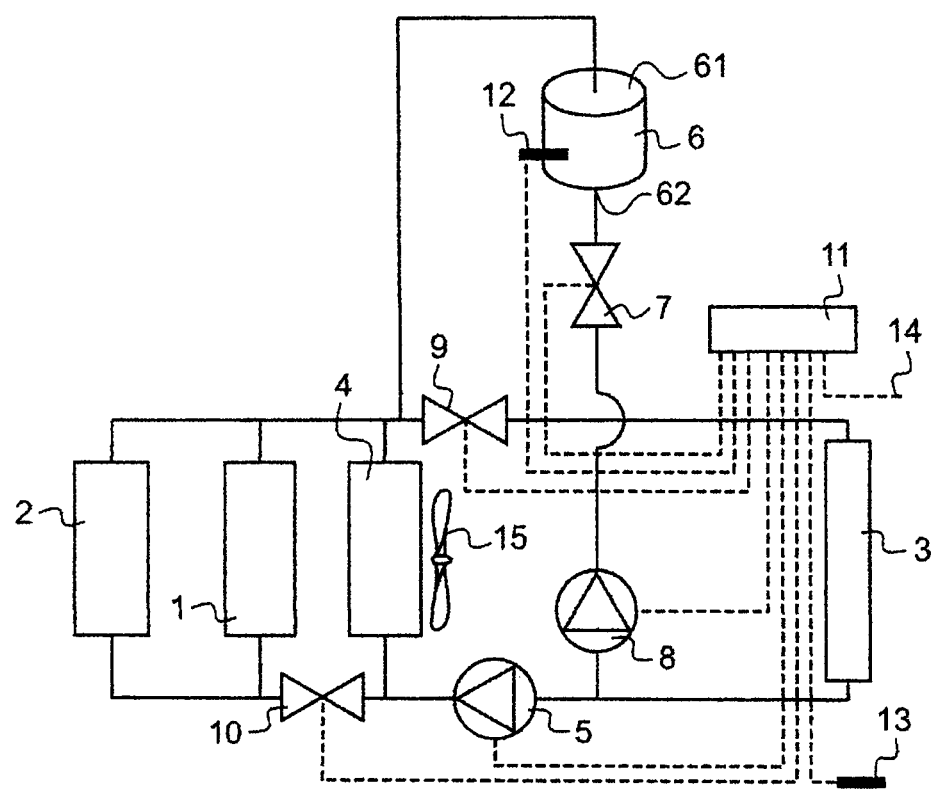

AUTOMOBILE WITH ELECTRIC MOTOR COMPRISING A COOLING CIRCUIT FOR THE ELECTRONIC POWER CIRCUIT CONNECTED TO A HEATING RADIATOR OF THE PASSENGER COMPARTMENT

BACKGROUND OF THE INVENTION

The present invention relates to a motor vehicle fitted with an electric motor and comprising an electronic power circuit cooled by a cooling circuit in which a coolant fluid circulates. This cooling circuit comprises a radiator for heating the passenger compartment. This radiator for heating the passenger compartment can transfer the calories carried by the coolant fluid of the cooling circuit to the air of the passenger compartment of the vehicle.

Document FR 2 757 456 describes a motor vehicle which comprises an electric motor and an electronic power circuit cooled by a cooling circuit in which a coolant fluid circulates. This cooling circuit comprises a heating radiator that can transfer the calories of the hot coolant fluid to the air of the passenger compartment of the vehicle. In order to boost the heating produced only by the coolant fluid of the cooling circuit, the aforementioned document proposes to use a two-layer heating radiator. In one of these layers, the coolant fluid of the cooling circuit circulates, while the other layer forms part of a second circuit in which a second coolant fluid circulates which can be reheated by an electric resistance connected to the battery of the vehicle.

Although the heating of the passenger compartment of the vehicle is improved by the device recommended by the aforementioned document, heating of the vehicle on starting remains problematic. Specifically, on starting, the fluid of the cooling circuit is cold and the heating must therefore use only the second layer in which the coolant fluid is heated by a resistance which draws its electric energy from the battery of the vehicle. However, in cold weather, the chemical reaction that takes place in the battery is greatly slowed and the battery cannot always start the vehicle and therefore supply energy to the aforementioned heating resistance.

The lack of heating of the passenger compartment is not only a problem of comfort. It may be dangerous because of the misting covering the windows of the passenger compartment which greatly hampers driving and even prevents it totally.

SUMMARY OF THE INVENTION

One object of the present invention is therefore to propose an electric motor vehicle which has a passenger compartment which can be easily and rapidly heated even when the vehicle starts.

For the purpose of solving this problem, the present invention proposes a motor vehicle comprising an electric motor, a passenger compartment, an electronic power circuit and a cooling circuit for cooling said electronic power circuit, in which a coolant fluid circulates and which comprises:
  a heat exchanger capable of carrying away the calories transported by said coolant fluid to the outside of said vehicle; and
  a heating radiator placed upstream of said exchanger, capable of transferring the calories transported by said coolant fluid to the air of said passenger compartment, by means of a fan.

According to the invention, said cooling circuit comprises an adiabatic reservoir capable of storing at least a fraction of said coolant fluid circulating in said cooling circuit, in compensation for which, by storing at least a fraction of said fluid reheated during the operation of said vehicle, it is possible, by inserting said hot fluid stored in said adiabatic reservoir into said heating radiator, to rapidly heat the passenger compartment when said vehicle starts or to demist the windows.

The circulation of the hot fluid in the cooling circuit does not consume much electric energy and can therefore be used when the vehicle starts.

The cooling circuit of a vehicle with an electric motor is simpler than the cooling circuit of a vehicle with a heat engine. The cooling circuit that is fitted to the vehicle according to the invention is therefore simple to fill and to drain.

Moreover, the adiabatic reservoir can be easily installed, notably in the motor compartment of the vehicle. Specifically, the motor compartment contains only the motor, the electronic power circuit and the transmission members. The battery or batteries, which may be bulky, are usually placed outside the motor compartment.

Advantageously, said reservoir is placed above said cooling circuit so that said stored fluid flows into said cooling circuit under the effect of gravity. In this way, it is possible to have the hot fluid circulate in the cooling circuit without making use of the battery.

In a motor vehicle operating with an electric motor, the members to be cooled are at a lower level than in a vehicle with heat engine. In the case of an electric vehicle, it is therefore easy to place, in the motor compartment, for example, an adiabatic reservoir that allows the gravity flow of the coolant fluid.

Advantageously, said adiabatic reservoir comprises an inlet connected to the outlet of said heating radiator and an outlet connected to said inlet of said heating radiator. This arrangement makes it possible to prevent the hot fluid from circulating immediately in the heat exchanger where it would be cooled. The heat stored in the reservoir is therefore used to the maximum for heating the passenger compartment.

According to one embodiment, said cooling circuit comprises a secondary pump capable of transferring all the volume of said coolant fluid into said adiabatic reservoir. This pump makes it possible to rapidly empty the cooling circuit when the vehicle stops. The hot fluid does not have time to cool down. Since the whole volume of the fluid is stored in the reservoir, the maximum possible heat is thus stored. Moreover, the draining of the cooling circuit makes it possible to not increase the volume of the coolant fluid circulating in the cooling circuit, which makes it possible not to add weight to the vehicle.

Advantageously, the vehicle comprises a valve-forming means placed so as to allow the flow rate of said fluid to said heat exchanger to be cut off or reduced. Therefore, when the vehicle stops, it is possible to isolate the heat exchanger. When starting, since the hot fluid is not circulating in the exchanger, it discharges its heat only in the radiator for heating the passenger compartment and thus optimizes the heating of the vehicle.

Advantageously, said cooling circuit also makes it possible to cool said motor. The presence of a single cooling circuit makes it possible not to add weight to the vehicle.

In this case, said cooling circuit may comprise secondary valve-forming means placed so as to allow the cutting off of the circulation of said fluid in the portion of said cooling circuit used for the cooling of said motor. These secondary valve-forming means make it possible either to prevent the hot fluid from circulating toward the motor, or to reduce their flow rate to the minimum necessary.

BRIEF DESCRIPTION OF THE DRAWINGS

Other particular features and advantages of the invention will emerge on reading the description made below of a particular embodiment of the invention, given as an indication but not limiting, with reference to the appended drawing in which:

the single FIGURE shows schematically an embodiment of the cooling circuit fitted to the vehicle according to the invention.

DETAILED DESCRIPTION OF THE INVENTION

FIG. 1 represents an example of a cooling circuit, with its related elements, fitted to a vehicle according to the invention. The solid lines represent the ducts in which the coolant fluid circulates. The dashed lines represent the electrical connections.

As shown in FIG. 1, the vehicle according to the invention comprises an electric motor 1 and an electronic power circuit 2. The motor 1 is cooled by a heat exchanger (not shown) which can be a simple coil, surrounding the motor, in which a coolant fluid circulates. The same applies to the electronic power circuit 2. The two heat exchangers, situated respectively on the motor 1 and on the electronic power circuit 2, are connected in parallel with one another by ducts in which the same coolant fluid circulates.

In the rest of the description, for simplification purposes, for the elements that are not themselves traveled through by the coolant fluid of the cooling circuit, but that are simply thermally connected to the cooling circuit, for example, by means of heat exchangers (this is the case of the motor 1, of the electronic power circuit 2), the presence of such heat exchangers will not be mentioned and mention will be made directly of the element thermally connected to the cooling circuit.

The motor 1 and the electronic power circuit 2, thermally connected in parallel, and the radiator 3 and the electric pump 5 form a hot loop. This hot loop makes it possible to transfer the calories transported by the coolant fluid, heated in contact with the motor 1 and with the electronic power circuit 2, to the air outside the vehicle. The cooling radiator 3 is thermally connected in series with the motor 1 and the electronic power circuit 2. The hot loop and the cooling radiator 3 form the cooling circuit of the vehicle.

As shown in FIG. 1, a heating radiator 4 is thermally connected in parallel with the motor 1 and the electronic power circuit 2. This heating radiator 4 is placed so as to allow the hot coolant fluid leaving the hot loop to give up the calories that it transports to the air of the passenger compartment of the vehicle, by means of the fan 15. In the example shown, the cooling radiator 3 is connected to the outlet of the cooling exchanger of the motor 1 and to the inlet of the pump 5 circulating the fluid in the cooling circuit and in the heating radiator 4. Valve-forming means (not shown) make it possible to short-circuit the cooling radiator 3. When the cooling radiator 3 is short-circuited, the fluid then circulates either between the motor 1, the electronic power circuit 2 and the heating radiator 4 and the adiabatic reservoir 6—this makes it possible not to cool the cooling liquid when there is a cold start—or the fluid circulates mainly in the heating radiator 4 and the flow rate is reduced to a minimum in the electric motor 1 and the power electronics 2 so that the fluid does not heat up there and so that the motor 1 and the power electronics do not put the heating of the passenger compartment at a disadvantage.

With reference to FIG. 1, the vehicle comprises an adiabatic reservoir 6 (a double-walled, insulated reservoir, for example) that is connected to the cooling circuit, downstream of the heating radiator 4 and upstream of the inlet of the cooling radiator 3. This adiabatic reservoir 6 comprises an inlet 61, connected to the cooling circuit, between the heating radiator 4 and the inlet of the cooling radiator 3, and an outlet 62 fitted with first valve-forming means 7. The outlet 62 is connected to the cooling circuit between the outlet of the cooling radiator 3 and the inlet of the heating radiator 4, while passing through the pump 5. The first valve-forming means 7 make it possible to close the outlet 62 of the reservoir 6. A secondary pump 8 is placed on the duct connecting the outlet 62 to the cooling circuit, downstream of the first valve-forming means 7. This secondary pump 8 makes it possible to fill the adiabatic reservoir 6 with the coolant fluid circulating in the cooling circuit and optionally the heating radiator 4. Second valve-forming means 9 are placed on the cooling circuit, downstream of the heating radiator 4 and downstream of the connection between the cooling circuit and the adiabatic reservoir 6. These second valve-forming means 9 make it possible to close off the circulation of the coolant fluid to the cooling radiator 3 and to send the coolant fluid leaving the heating radiator 4 into the adiabatic reservoir 6, upstream of the cooling radiator 3. Third valve-forming means 10 (or secondary valve-forming means) are placed on the cooling circuit between the heating radiator 4 and the motor 1. These third valve-forming means 10 make it possible to short-circuit the motor 1 and the electronic power circuit 2 when there is a cold start, or to reduce their flow rate.

In a vehicle operating with an electric motor, it is easy to insert the reservoir 6 into the motor compartment, above the motor 1 and the electronic power circuit 2 so that the fluid contained in the reservoir flows by gravity into the cooling circuit. This gravity flow makes it possible to avoid the use of a pump to drain the reservoir and requires no electric energy. This solution also makes it possible to avoid the problems of priming the main pump 5, notable when the vehicle is stationary on a slope.

As shown in FIG. 1, the vehicle also comprises a computer 11 which drives a temperature sensor 12. This temperature sensor 12 measures the temperature of the coolant fluid stored in the adiabatic reservoir 6. The computer 11 also drives an external temperature sensor 13 which measures the external temperature. The computer 11 also drives the main and secondary pumps 5 and 8 and the heating and/or demisting setting 14 situated in the passenger compartment. The computer 11 also drives the first, second and third valve-forming means 7, 9 and 10 based on the information given to it by the temperature sensors 12 and 13 and the demisting/heating setting 14.

The operation of the invention will now be explained.

When the vehicle is running, the motor 1 operates and is cooled by the cooling circuit. If the user of the vehicle indicates, via the heating and/or demisting setting, that it does not want to heat the passenger compartment, the computer 11 cuts off the fan 15, the coolant fluid circulates in the heating radiator 4, but the calories are not given up to the passenger compartment. The coolant fluid also circulates in the motor 1, the electronic power circuit 2 and the cooling radiator 3, cooling only the motor 1 and the electronic power circuit 2. The same applies when the external temperature sensor 13 and/or the temperature sensor of the motor (not shown in FIG. 1) detect(s) that the temperature outside the vehicle is higher than a given setting.

If the user indicates that he desires to heat the passenger compartment, via the demisting/heating setting 14, he manually starts the fan 15. If the external temperature sensor 13 detects that the ambient temperature is below a given setting value, the computer 11 starts the fan 15 (depending on the information given by the sensors 12 and 13) and the coolant fluid passes through the heating radiator 4 to heat the passenger compartment. The cooling circuit makes it possible both to heat the passenger compartment and to cool the motor 1 and the electronic power circuit 2.

When the vehicle stops, the coolant fluid is hot. The computer 11 opens the first, second and third valve-forming means 7, 9 and 10 and actuates the secondary pump 8 in order to draw all or the majority of the coolant fluid and inject it into the adiabatic reservoir 6. The hot coolant fluid is thus stored in the adiabatic reservoir 6 which makes it possible to store the calories that it has accumulated.

At the time of the next start, when the user requires the heating and/or the demisting (via the heating/demisting setting 14 or the starting of the fan by the driver) or when the ambient temperature sensor 13 detects that the outside temperature is below the given setting value, the computer 11 closes to a greater or lesser degree the second and third valve-forming means 9 and 10 and opens to a greater or lesser degree the first valve-forming means 7. The flow rates that circulate in the various branches depend on the information transmitted to the computer 11 by the temperature sensors 12 and 13 and by temperature sensors (not shown) that measure the temperature of the motor 1 and of the electronic power circuit 2. When the first valve-forming means 7 are open, the coolant fluid flows from the adiabatic reservoir 6 into the heating radiator 4, thus heating the air of the passenger compartment. The computer 11 actuates the main pump 5 and the hot coolant fluid circulates between the adiabatic reservoir 6 and the heating radiator 4. The air of the passenger compartment is thus heated.

When the electronic power circuit 2 and/or the motor 1 heats up, the computer 11 opens to a greater or lesser degree the second and third valve-forming means 9 and 10. The coolant fluid then circulates throughout the whole cooling circuit and allows simultaneously the heating of the passenger compartment, through its circulation in the heating radiator 4, and the cooling of the motor 1 and of the electronic power circuit 2 through its circulation in the cooling radiator 3 and in the heating radiator 4 which is also used to carry away the heat transported by the coolant fluid. The reservoir 6 is not short-circuited and the fluid continues to pass through it. The adiabatic reservoir 6 then serves as a degassing bottle for the coolant fluid. The coolant fluid/air mixture enters the adiabatic reservoir 6 under the effect of the increase in volume (the reservoir having a larger diameter than that of the duct), the air separates from the fluid and stays in the adiabatic reservoir 6.

When there is a start without requiring heating and/or demisting, the computer 11 opens the first, second and third valve-forming means 7, 9 and 10. When the cooling circuit is filled with the coolant fluid flowing from the adiabatic reservoir 6, the computer 11 actuates the main pump 5 which starts the fluid circulating. The coolant fluid immediately circulates in the motor 1 and the electronic power circuit 2 allowing them to be cooled. The fluid also circulates in the reservoir 6 which is used, as explained above, as a degassing bottle.

In a vehicle with an electric motor, the temperature of the coolant fluid remains relatively low, of the order of 50° C. to 60° C. Accordingly, the adiabatic reservoir that is used as a degassing bottle (expansion tank) can be at atmospheric pressure. The cooling circuit is therefore simple to achieve.

The coolant fluid can be water with added antifreeze.

The motor 1 and the electronic power circuit 2 can also be thermally connected in series.

The invention claimed is:

1. A motor vehicle, comprising:
   an electric motor;
   a passenger compartment;
   an electronic power circuit; and
   a cooling circuit for cooling the electronic power circuit, in which a coolant fluid circulates, and which comprises:
      a heat exchanger configured to carry away calories transported by the coolant fluid to outside of the vehicle;
      a heating radiator placed upstream of the heat exchanger, configured to transfer the calories transported by the coolant fluid to air of the passenger compartment, by a fan;
      an adiabatic reservoir configured to store all of the coolant fluid circulating in the cooling circuit, in compensation for which, by storing all of the fluid reheated during the operation of the vehicle, it is possible, by inserting the fluid stored in the adiabatic reservoir into the heating radiator, to rapidly heat the passenger compartment when the vehicle starts; and
      a secondary pump configured to transfer all of the coolant fluid into the adiabatic reservoir,
   wherein the adiabatic reservoir comprises an inlet directly connected to an outlet of the heating radiator and an outlet connected to an inlet of the heating radiator.

2. The motor vehicle as claimed in claim 1, wherein the reservoir is placed above the cooling circuit so that the stored fluid flows into the cooling circuit under effect of gravity.

3. The vehicle as claimed in claim 1, further comprising a valve-forming means connected to the outlet of the adiabatic reservoir and configured to cut off circulation of the fluid to the heat exchanger.

4. The vehicle as claimed in claim 1, wherein the cooling circuit also makes it possible to cool the motor.

5. The vehicle as claimed in claim 4, wherein the cooling circuit further comprises complementary valve-forming means placed to allow cutting off or reduction of flow of the coolant fluid in a portion of the cooling circuit used for cooling of the motor.

6. The vehicle as claimed in claim 1, further comprising a computer configured to drive a temperature sensor configured to measure a temperature of the coolant fluid stored in the adiabatic reservoir, and the computer is configured to drive an external temperature sensor configured to measure the external temperature.

7. The vehicle as claimed in claim 1, wherein the electronic power circuit, the electric motor, and the heating radiator are connected in parallel.

\* \* \* \* \*